United States Patent [19]

Davis et al.

[11] 4,319,222
[45] Mar. 9, 1982

[54] TRANSMITTER APPARATUS FOR AN INFORMATION TRANSMISSION SYSTEM

[75] Inventors: Christopher K. Davis, Crawley; Richard F. Mitchell, Merstham, both of England

[73] Assignee: U.S. Philips Corporation, New York, N.Y.

[21] Appl. No.: 135,962

[22] Filed: Mar. 31, 1980

[30] Foreign Application Priority Data

Apr. 4, 1979 [GB] United Kingdom ............... 11733/79

[51] Int. Cl.³ ........................... H04Q 5/00; H04J 6/02
[52] U.S. Cl. .................. 340/825.5; 178/2 R; 370/80
[58] Field of Search ............... 340/147 LP; 178/2, 3; 370/80, 79, 56

[56] References Cited

U.S. PATENT DOCUMENTS

| | | | |
|---|---|---|---|
| 3,854,014 | 12/1974 | Akin et al. | 179/18 BG |
| 3,919,461 | 11/1975 | Hunting et al. | 178/2 R |
| 3,969,589 | 7/1976 | Meise, Jr. et al. | 179/29 D |
| 4,016,539 | 4/1977 | Nanya | 340/147 LP |
| 4,048,452 | 9/1977 | Oehring et al. | 179/27 D |
| 4,148,011 | 4/1979 | McLagan et al. | 340/147 LP |
| 4,210,780 | 7/1980 | Hopkins et al. | 370/80 |

Primary Examiner—Donald J. Yusko
Attorney, Agent, or Firm—Thomas A. Briody; William J. Streeter; Edward W. Goodman

[57] ABSTRACT

In order to form a first-come first-served queue in an information transmission system employing a common transmission channel when several transmitters of the system try to gain access to the channel when it is already occupied, without employing a further transmission channel to a point at which an account is kept of the order in which the various transmitters request access, each transmitter which tries to gain access in these circumstances is caused to delay after the channel subsequently free before it actually accesses the channel, this delay being inversely proportional to the time the corresponding transmitter has waited. Thus the transmitter which has waited the longest gains the channel first and causes the other waiting transmitters to continue to wait.

6 Claims, 8 Drawing Figures

TRANSMITTER APPARATUS FOR AN INFORMATION TRANSMISSION SYSTEM

BACKGROUND OF THE INVENTION

The invention relates to transmitter apparatus for an information transmission system, which system comprises at least two such apparatuses having their outputs coupled to a common transmission path; said apparatus comprising a transmitter, an indicator circuit, constructed to generate an output signal indicative of whether or not the transmission path is in use, and a control circuit having an input for a transmit-request signal, the output of said indicator circuit being coupled to said control circuit and said control circuit being constructed to generate at an output thereof, which output is coupled to a control input of said transmitter, a transmission activation signal for said transmitter in response to the application of a transmit-request signal to the control circuit input, the instant of generation of said activation signal depending on the output of said indicator circuit in such manner that, if said indicator circuit is indicating that the transmission path is in use when the transmit-request signal is applied to the control circuit input, said activation signal will be generated at an instant which occurs a predetermined time interval after the indicator circuit subsequently indicates that the transmission path has become clear, and only then provided that the indicator circuit is then indicating that the transmission path is clear.

U.S. Pat. No. 2731635 discloses an information transmission system comprising apparatuses of this type in which, if transmit-request signals are applied to the inputs of the control circuits of a plurality of apparatuses of the system while another apparatus of the system is transmitting and hence occupying the transmission path, the apparatuses of the plurality will be put into a hold condition until the transmission has ended. At the instant that the transmission ends the indicator circuits of the apparatuses of the plurality indicate this fact and the corresponding control circuits activate the corresponding transmitters to transmit intelligence at instants which each occur a predetermined time interval thereafter, provided that the corresponding indicator circuits are indicating that the transmission path is clear at said instants. The predetermined time intervals are fixed and a different one is assigned to each apparatus. Thus, after the transmission path becomes free, that apparatus in the hold condition to which the shortest predetermined time interval has been assigned will commence transmitting its intelligence first, resetting the other apparatuses which were in the hold condition, back to the hold condition until the transmission path again becomes free. In this way the apparatuses of the system are given a predetermined and fixed order of priority for transmission if more than one should attempt transmission at the same time.

It is sometimes desirable that a "first-come first-served" order of priority be established in an information transmission system in which several apparatuses of the system, for example several mobile radios, are coupled to a common transmission path, for example to a broadcast channel or group of broadcast channels to a base station, if more than one such apparatus attempts to transmit while the transmission path is in use. Of course such an order of priority could be established by providing a further broadcast channel to the base station, over which each apparatus transmits a request signal when it requires to transmit, the base station then keeping an account of the order in which the various requests are issued and transmitting, each time the path ceases to be in use, a "request-accepted" signal to the apparatus which is at the head of the queue at that time. However, the provision of the further channel is wasteful in that it will occupy valuable space in the (limited) part of the broadcast spectrum which is available. It is an object of the invention to mitigate this disadvantage.

SUMMARY OF THE INVENTION

The invention provides transmitter apparatus for an information transmission system, which system comprises at least two such apparatuses having their outputs coupled to a common transmission path, said apparatus comprising a transmitter, an indicator circuit constructed to generate an output signal indicative of whether or not the transmission path is fully occupied, and a control circuit having an input for a transmit-request signal, the output of said indicator circuit being coupled to said control circuit and said control circuit being constructed to generate at an output thereof, which output is coupled to a control input of said transmitter, a transmission activation signal for said transmitter in response to the application of a transmit-request signal to the control circuit input, the instant of generation of said activation signal depending on the output of said indicator circuit in such manner that, if said indicator circuit is indicating that the transmission path is fully occupied when the transmit-request signal is applied to the control circuit input, said activation signal will be generated at an instant which occurs a predetermined time interval after the indicator circuit subsequently indicates that the transmission path has become clear, and only then provided that the indicator circuit is then indicating that the transmission path is clear, characterised in that the control circuit is constructed so that said predetermined time interval will be inversely proportional to the time which elapses between the application of said transmit-request signal to said input and the subsequent indication by the indicator circuit that the transmission path has become clear.

It has now been recognised that at least an approximation to a "first-come first-served" order of priority can be obtained without the necessity of providing a further transmission channel if each apparatus of the system which attempts transmission while the transmission path is in use, is caused to wait until an instant which occurs a predetermined time interval after the path subsequently becomes clear before it actually commences transmission, provided that this predetermined time interval is arranged to be inversely proportional to the time which has elapsed between the apparatus initially requiring transmission and the transmission path subsequently becoming clear. If this is the case, then, after the transmission path becomes clear, that apparatus in which transmission was attempted first, will normally commence transmission first and in doing so can be arranged to cause the other apparatuses which have been waiting, to be maintained in that state until the transmission path once again becomes clear.

It should be noted that the transmission path may be "in use" even when no information is instantaneously being transmitted thereon, for example during pauses in a speech transmission.

In order that an apparatus of the system which attempts transmission at an instant when the transmission path is not fully occupied, should be subjected to the minimum delay, it will normally be preferable that the control circuit is constructed to generate at its output a transmission activation signal for the transmitter substantially immediately in response to the application of a transmit-request signal to its input if the indicator circuit is indicating that the transmission path is clear when the transmit-request signal is applied to the control circuit input.

It may be that, while the transmission path is in use, two or more apparatuses of the system will attempt transmission at substantially the same instant. If the times when these attempts occur are sufficiently close together it may be that the respective control circuits will subsequently generate their activation signals simultaneously because they have determined the times which elapsed between the application of the transmit-request signals to their inputs and the transmission path subsequently becoming clear with insufficient resolution. In such circumstances, transmission from these apparatuses would clash unless steps are taken to prevent it. In order to reduce the likelihood of such clashes occurring, if the system is such that it includes a transmitter/receiver to the receiver section of which said transmission path extends, which transmitter/receiver is constructed to respond to the reception of transmissions from a plurality of transmitter apparatuses of the system simultaneously on the same channel by transmitting a first type of signal and is constructed to respond to the subsequent reception of a further transmitter apparatus of the plurality by transmitting a second type of signal, said indicator circuit may be constructed to produce first and second kinds of output signal in response to reception by the apparatus of the first and second types of signal, respectively, and said control circuit may be constructed to respond to the production of an output signal of the first kind by the indicator circuit subsequent to the generation of a first activation signal by the control circuit, by generating a second activation signal at an instant which occurs a predetermined time interval after the indicator circuit produces its output signal of the first kind, and only then provided that the indicator circuit is not then producing an output signal of the second kind, this predetermined time interval being inversely proportional to the time which elapsed between the application of a transmit-request signal to the control circuit input and the subsequent generation of the first activation signal at the control circuit output, and moreover, depending on said time in such manner that smaller differences in said time will result in different values thereof than are required to result in different values of the predetermined time interval after which the first activation signal was generated. In this way it can be arranged that, if transmissions from two or more apparatuses clash, the control circuit of each of these apparatuses is reactivated to potentially produce a second activation signal in a similar manner to that in which it produced the first, but at an instant which is determined with increased resolution by the time at which the corresponding apparatus initially attempted transmission.

The control circuit may comprise first and second counters, means constructed to respond to the application of a transmit-request signal to the control circuit input at a time when said indicator circuit is indicating that the transmission path is in use by causing the content of the first counter to be periodically incremented or decremented, starting from a predetermined value of said content, for as long as the indicator circuit continues to indicate that the transmission path is fully occupied, means constructed to respond to the subsequent indication by said indicator circuit that the transmission path has become clear by causing the content of the second counter to be periodically incremented or decremented either (a) starting from a fixed first value and continuing towards a second value which bears a predetermined relationship to the value which the content of the first counter had when the indicator circuit produces said subsequent indication or (b) towards a fixed second value starting from a first value which bears a predetermined relationship to the value which the content of the first counter had when the indicator circuit produced said subsequent indication, and means constructed to respond to the count in the second counter reaching the relevant second value by causing said activation signal to be generated, provided that the indicator circuit is then indicating that the transmission path is clear. Moreover, the control circuit may comprise means constructed to respond to the generation of an output signal of the first kind by said indicator circuit subsequent to the generation of a first activation signal by said control circuit by causing the content of a counter to be periodically incremented or decremented either (a) starting from a fixed first value and continuing towards a second value which bears a predetermined relationship to the value which the content of another counter has when the indicator circuit produces its output signal of the first kind or (b) towards a fixed second value starting from a first value which bears a predetermined relationship to the value which the content of another counter has when the indicator circuit produces its output signal of the first kind, said another counter having been incremented or decremented, starting from a predetermined value, from the instant that the transmit-request signal which gave rise to said first activation signal was applied to the input of the control circuit, and means constructed to respond to the count in the said another counter reaching the relevant second value by causing a second activation signal to be generated provided that the indicator circuit is not then producing an output signal of the second kind. The provision of such counters and means can enable the required dependence of the output signal of the control circuit on the transmit-request signal and the output signal(s) of the indicator circuit to be obtained in a simple manner, particularly if the functions of the said means are performed by a programmed digital signal processing system.

DESCRIPTION OF THE DRAWINGS

Embodiments of the invention will now be described, by way of example, with reference to the accompanying diagrammatic drawings, in which.

DESCRIPTION OF THE PREFERRED EMBODIMENT

Figure 1:
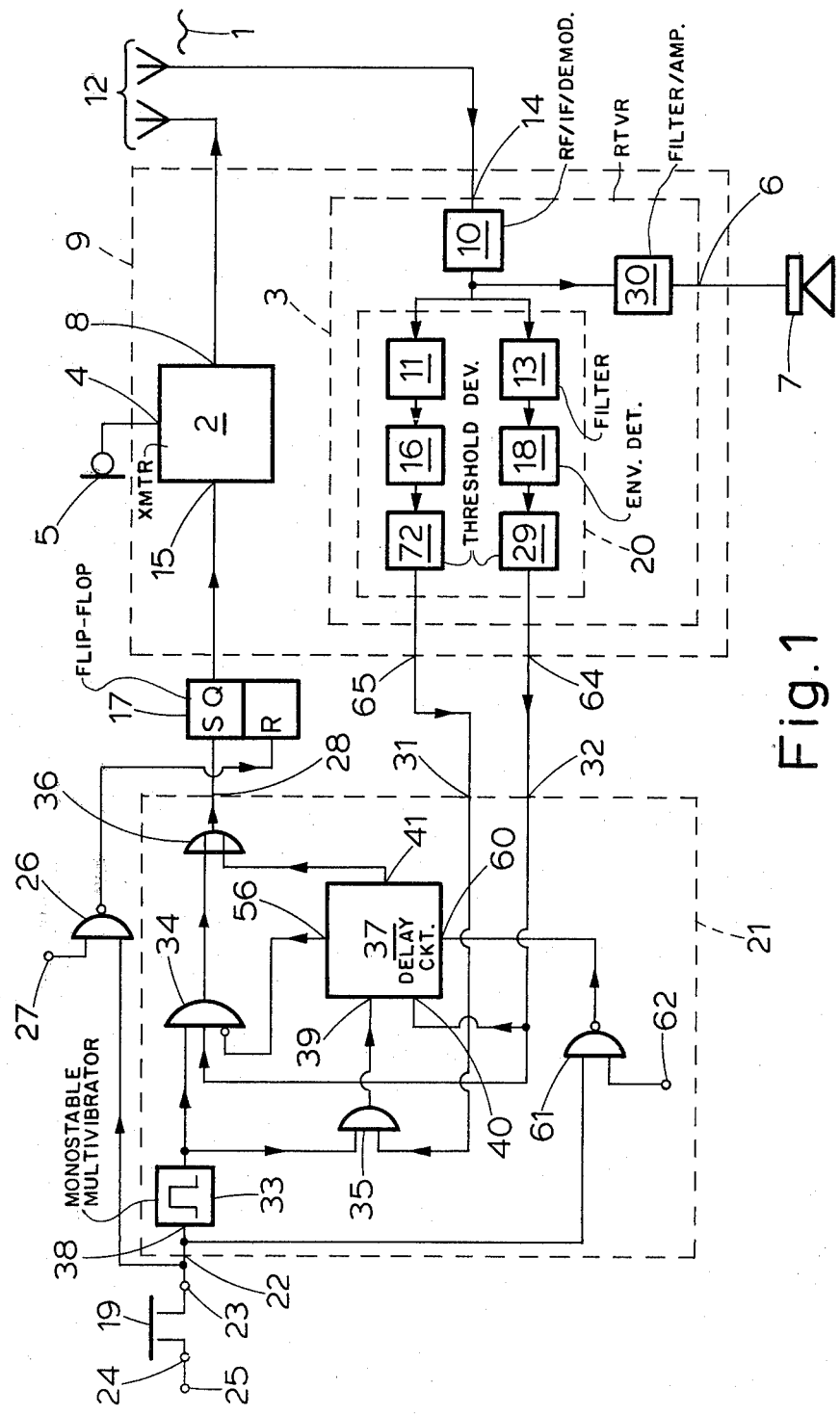
FIG. 1 shows a first embodiment in schematic form.

In FIG. 1 transmitter apparatus, for an information transmission system, which system comprises at least two such apparatuses having their outputs coupled to a common transmission path, in the present example, a duplex broadcast channel 1 to the receiver section of a base station transmitter/receiver (not shown) which also forms part of the system, includes a radio section 9 comprising a transmitter section 2 and a receiver section 3. A modulation signal input 4 of transmitter section 2 is coupled to the output of a microphone 5, and an output 6 of receiver section 3 is coupled to a loudspeaker 7. The output 8 of transmitter section 2 is coupled to an aerial system 12, the system 12 also being coupled to the input 14 of receiver section 3.

Transmitter section 2 also has a control input 15: the application of a logic "1" to this input causes the transmitter section 2 to be activated and to supply a carrier, which can be modulated by an output signal from microphone 5, to the aerial system 12, while the application of a logic "0" to this input causes the transmitter section 2 to be deactivated. The control input 15 is fed from the non-inverting output of a set-reset flip-flop 17.

Communication to the base station takes place on a broadcast channel defined by the carrier output frequency of transmitter section 2, this carrier output frequency being the same for all transmitter apparatuses of the system. The base station also includes a transmitter the carrier output frequency of which is different than that of the transmitter section 2; the receiver section 3 is tuned to the carrier output frequency of this transmitter as are the corresponding receiver sections of the other transmitter apparatuses of the system. The base station transmitter includes a carrier modulator in known manner, to which modulator are coupled the output or a microphone and also the outputs of first and second audio tone or audio tone combination generators which can be individually activated as alternatives, so that the output signal of the base station transmitter consists at all times of a carrier modulated with the output of one of the generators plus any output from the base station microphone. The output of the first generator may lie, for example, at 2.2 kHz and the output of the second generator may lie, for example, at 2.7 kHz. Activation signal inputs of the two generators are coupled to an output of the base station receiver in such manner that, when a carrier is being received by the base station receiver (channel 1 busy) the first generator is activated, and when no carrier is being received by the base station receiver (channel 1 free) the second generator is activated. This may be done, for example, by feeding any signal received by the base station receiver, and to which the base station receiver is tuned, to an envelope detector, and feeding the output of this detector to a threshold responsive device, such as a Schmitt trigger, non-inverting and inverting outputs of which are connected to the activation signal inputs of the first and second tone generators, respectively. Thus, when the channel 1 is busy the base station carrier output signal is modulated with the output of the first tone generator (plus any output from the base station microphone) and when the channel 1 is free the base station carrier output signal is modulated with the output of the second tone generator (plus any output from the base station microphone).

Receiver section 3 comprises a tuned RF, IF and demodulator section 10, first and second filter circuits 11 and 13 tuned and constructed to pass the output frequencies of the first and second tone generators in the base station, respectively, and fed from the output of the section 10, first and second envelope detectors 16 and 18, respectively, fed from the outputs of the filter circuits 11 and 13, respectively, first and second threshold responsive devices 72 and 29, respectively, fed from the outputs of the detectors 16 and 18, respectively, and a filter and audio amplifier 30, the input of which is coupled to the output of the section 10 and the output of which is connected to the output terminal 6 of the receiver section 3. The filter circuit in the amplifier 30 is tuned and constructed to block frequencies equal to the output frequencies of the tone generators included in the base station, so that loudspeaker 7 is fed only with the output signal of the base station microphone. On the other hand the filter circuits 11 and 13 are constructed to pass only the frequencies to which they are tuned, with the result that envelope detector 16 produces an output only when the first tone generator in the base station is activated, i.e. only when the channel 1 is busy, and envelope detector 18 produces an output only when the second tone generator in the base station is activated, i.e. only when the channel 1 is free. Each threshold responsive device 72 and 29 (which may be constructed as a Schmitt trigger) produces a logic "1" at its output when the value of the input signal thereto exceeds a predetermined threshold; otherwise it produces a logic "0". These outputs are coupled to output terminals 65 and 64, respectively, of radio section 9 and, therefore, a logic "1" appears at terminal 65 and a logic "0" appears at terminal 64 when channel 1 is busy, and a logic "0" appears at terminal 65 and a logic "1" appears at terminal 64 when channel 1 is free. The arrangement 11/13, 16/18, 71/29 therefore constitutes an indicator circuit 20 which indicates whether or not the transmission path 1 is in use.

The transmitter apparatus of FIG. 1 also includes a "press-to-communicate" switch 19 and a control circuit 21. Control circuit 21 has an input 22 for a transmit-request signal, which input is coupled to one contact 23 of press-to-communicate switch 19. The other contact 24 of switch 19 is connected to a terminal 25 to which is applied a steady logic "1" signal in operation. Contact 23 of switch 19 is also coupled to the reset input of flip-flop 17 via an inverter in the form of a logic NAND gate 26 a second input of which is fed in operation with a steady logic "1" signal from a terminal 27. The set input of flip-flop 17 is coupled to the output 28 of the control circuit 21. Control circuit 21 also has two further input terminals 31 and 32 which are connected to the outputs 65 and 64, respectively, of radio section 9, i.e. to the outputs of the threshold-responsive devices 72 and 29, respectively, of indicator circuit 20.

Control circuit 21 is constructed to generate a logic "1", or transmission activation signal, at its output 28 in response to the application of a logic "1", or transmit-request signal, to its input 22 by press-to-communicate switch 19, and this is a manner which depends on the instantaneous output signal of indicator circuit 20. More specifically, if the transmission path 1 should be free when the press-to-communicate switch 19 is actuated, i.e. if the signals at the inputs 31 and 32 of control circuit 21 should then be logic "0" and logic "1" respectively, control circuit 21 is constructed to generate a logic "1" at its output 28 substantially immediately a logic "1" is applied by switch 19 to its input 22. On the other hand, if the transmission path 1 should be busy when the press-to-communicate switch 19 is actuated, i.e. if the signals at the inputs 31 and 32 of control circuit 21 should then be logic "1" and logic "0" respectively, control circuit 21 is constructed to generate a logic "1" at its output 28 only at an instant which occurs a predetermined time interval after transmission path 1 subsequently becomes clear, i.e. at a predetermined time interval after the signals at inputs 31 and 32 subsequently become logic "0" and logic "1", respectively, and only then provided that the transmission path 1 is clear at that instant, i.e. provided that the signals at the inputs 31 and 32 are logic "0" and logic "1" respectively at that instant. Moreover, said predetermined time interval is arranged to be shorter, the longer the time which elapses between the application of the logic "1" signal to input 22 and the subsequent change of the transmission path 1 from the busy to the free state, i.e. the subsequent change of the signals at the inputs 31 and 32 to logic "0" and logic "1", respectively.

To this end control circuit 21 comprises a monostable multivibrator 33 having an astable period of, for example 1/10th second, two AND gates 34 and 35, respectively, an OR gate 36, the output of which is coupled to the output 28 of control circuit 21, an inverter in the form of a NAND gate 61, an input 62 of which is fed with a steady logic "1", and a delay circuit 37. The trigger input 38 of monostable multivibrator 33 is fed from the transmit-request signal input 22 of control circuit 21 and its output is coupled to first inputs of each of the AND gates 34 and 35. The output of AND gate 34 is coupled to one input of OR gate 36, the other input of which is fed from the output 41 of delay circuit 37. Second inputs of the AND gates 34 and 35 are coupled to the inputs 32 and 31, respectively, of the control circuit 21, i.e. to the outputs of the threshold-responsive devices 29 and 72, respectively, of indicator circuit 20. A further and inverting input of AND gate 34 is coupled to a further output 56 of delay circuit 37. The output of AND gate 35 is coupled to a first input 39 of delay circuit 37, a second input 40 of delay circuit 37 being coupled to the input 32 of control circuit 21, i.e. to the output of threshold-responsive device 29. Inverter 61 couples the terminal 22 to a reset input 60 of delay circuit 37.

Each time the press-to-communicate switch 19 is actuated, i.e. closed, it applies a logic "1" signal to the trigger input of monostable multivibrator 33, with the result that multivibrator 33 momentarily generates a logic "1" at its output. If the transmission path 1 is unoccupied when this occurs, i.e. if the signals at the inputs 31 and 32 of control circuit 21 are logic "0" are logic "1", respectively, AND gate 34 will be enabled (the signal at the output 56 is normally logic "0") and AND gate 35 will be blocked. Thus the logic "1" generated at the output of monostable 33 will be transferred to the output 28 of control circuit 21 via gates 34 and 36, and thence to the "set" input of flip-flop 17, with the result that this flip-flop will be changed to the "set" state, resulting in the application of a logic "1" from its non-inverting output to the activation signal input 15 of transmitter section 2, and hence in the activation of transmitter section 2. The operator can now transmit a message or messages via the microphone 5 for as long as he maintains press-to-communicate switch 19 in the activated state. When the operator eventually releases switch 19 the resulting logic "0" at the input of inverter 26 results in a logic "1" being applied to the reset input of flip-flop 17, and the resetting of this flip-flop to the state in which its non-inverting output applies a logic "0" to the activation signal input 15 of transmitter section 2, so that transmitter section 2 is deactivated and the initial state is regained.

If, on the other hand, the transmission path 1 is in the occupied state when multivibrator 33 generates an output pulse in response to actuation of press-to-communicate switch 19, i.e. if the signals at the inputs 31 and 32 of control circuit 21 are logic "1" and logic "0", respectively, AND gate 34 will be disabled and AND gate 35 will be enabled, and the output pulse from multivibrator 33 will result (only) in the application of a logic "1" to input 39 of delay circuit 37 (the signal at the input 40 of which is logic "0"). Delay circuit 37 is constructed (as will be described in detail with reference to FIG. 2) in such manner that, if the signal at its input 40 should be logic "0" (transmission path 1 occupied), the application of a logic "1" to its input 39 will result in circuit 37 measuring (in arbitrary units) the time which elapses thereafter until a logic "1" is applied to its input 40 (transmission path 1 becomes unoccupied), and to generate a logic 1 at its output 41 at an instant which occurs a predetermined time interval after this application of the logic "1" to input 40, provided that the signal at its input 40 is logic "1" (transmission path 1 unoccupied) at this instant, the predetermined time being shorter, the longer the time which has elapsed between the application of the logic "1" to the input 39 and the application of the logic "1" to the input 40. The result, therefore, of the actuation of press-to-communicate switch 19 while the transmission path 1 is occupied is the production of a logic "1" at the output 41 of delay circuit 37 and hence at the output 28 of control circuit 21 at an instant subsequent to the signal at the input 32 of control circuit 21 subsequently becoming logic "1", i.e. subsequent to the transmission path "1" subsequently becoming unoccupied, this logic "1" only occurring if the transmission path 1 is unoccupied at said instant. The delay which occurs between the transmission path becoming unoccupied and the occurrence of the logic "1" at output 28, and hence the setting of the apparatus to the "transmit" condition, is shorter, the longer the time which elapses between the actuation of the press-to-communicate switch 19 and the transmission path 1 subsequently becoming unoccupied. Thus, if the operators of several apparatuses as shown in FIG. 1, which are all coupled to the same transmission path 1, actuate their respective press-to-communicate switches 19 while the transmission path is occupied, no transmission will in fact result until the transmission path subsequently becomes unoccupied. When the path does subsequently become unoccupied each of said apparatuses will wait before it commences transmission for a time which is smaller, the longer the time its operator has been waiting, so that the apparatus whose operator has been waiting longest will commence transmission first, occupying the transmission path and causing the other said apparatus(es) to remain in the non-transmissive state until after the path becomes unoccupied once again. As mentioned previously, this results substantially in the operators forming a "first-come first-served" or "first-in first-out" ordered queue without the necessity of providing an additional signalling channel to a control point which keeps an account of the times which the various operators have been waiting.

Delay circuit 37 is constructed to produce a logic "1" at its output 56, thus blocking gate 34, when a logic "1" is applied to input 39, and to maintain this logic "1" until a signal subsequently appears at its output 41. This is done so that, if the channel 1 is occupied when switch 19 is actuated, thereby actuating delay circuit 37, and the channel subsequently becomes free, a logic "1" cannot be produced at output 28 by another actuation of switch 19, but only by the production of a logic "1" at the output 41 of delay circuit 37.

Figure 2:
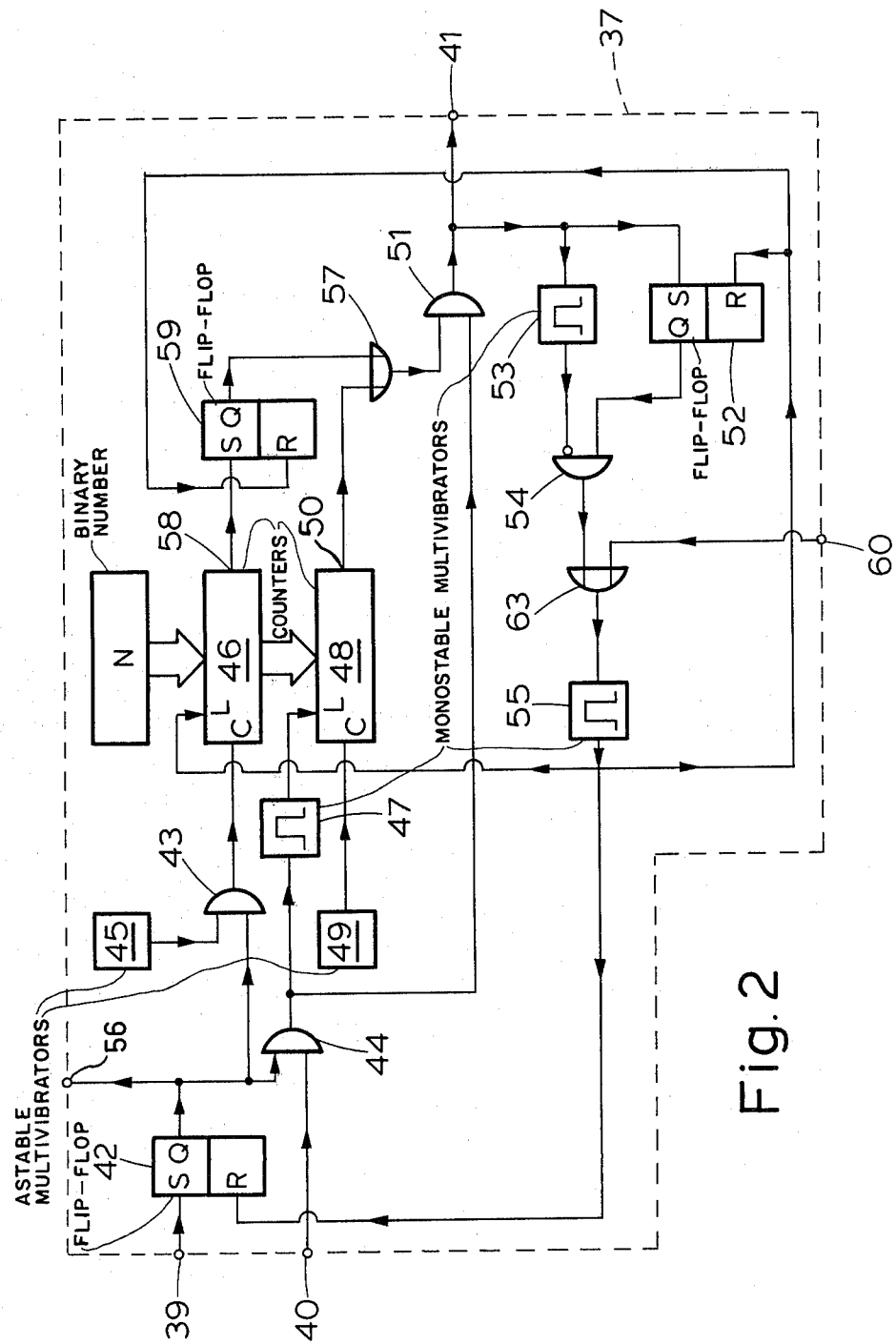
FIG. 2 shows part of the embodiment of FIG. 1 in more detail.

FIG. 2 shows a possible construction for the delay circuit 37 of FIG. 1, the inputs and output thereof being given the same references as in FIG. 1. The delay circuit 37 of FIG. 2 comprises a set-reset flip-flop 42, the set input S of which is fed from the input 39 and the non-inverting output Q of which is coupled to the output 56 and to first inputs of two AND gates 43 and 44, respectively. The second input of AND gate 43 is fed from the output of a first astable multivibrator 45 and the output of the gate is connected to the clock pulse input C of a first binary counter 46. The second input of AND gate 44 is fed from the input 40 and the gate 44 output is coupled to the trigger input of a monostable multivibrator 47 and to one input of an AND gate 51. The output of multivibrator 47 is coupled to the "load" input L of a second binary counter 48, the clock input C of which is coupled to the output of a second astable multivibrator 49 and the "binary value" input of which is coupled to the output of the first binary counter 46. The "terminal count" output 50 of counter 48 is coupled to the other input of the AND gate 51 via an OR gate 57. The output of gate 51 is coupled to the output 41 of the delay circuit 37 and also to the set input S of a further set-reset flip-flop 52 and to the trigger input of a further monostable multivibrator 53. The non-inverting output Q of flip-flop 52 is connected to the first input of an AND gate 54 the second and inverting input of which is coupled to the output of monostable multivibrator 53. The output of AND gate 54 is coupled via an OR gate 63, a further input of which is fed from the terminal 60, to the trigger input of a monostable multivibrator 55 the output of which is coupled to the reset inputs R of the flip-flops 42 and 52 and of a further set-reset flip-flop 59 and to the "load" input L of binary counter 46. The "set" input S of flip-flop 59 is connected to the "terminal count" output 58 of counter 46 and the non-inverting output Q thereof is connected to a further input of OR gate 57.

If, a described with reference to FIG. 1, the press-to-communicate switch 19 of FIG. 1 is actuated while the transmission path 1 is occupied, a logic "1" will be momentarily applied to the input 39 of delay circuit 37, and the signal at the input 40 of the delay circuit will be logic "0". When this happens, therefore, flip-flop 42 will be set, enabling gates 43 and 44 and producing a logic "1" at output 56. The output of the gate 44 remains logic "0" because the signal at input 40 is logic "0" but the gate 43 now transmits the output of multivibrator 45 (the output pulse frequency of which may be, for example, 2 Hz) to the clock input C of counter 46. Counter 46 has been previously loaded with a binary number N in a manner which will become apparent below, its "binary value" input pins being connected permanently to potentials corresponding to this number, so that counter 46 now counts down in the rhythm of the output pulses from multivibrator 45. Counter 46 may have a capacity of, for example, 128, i.e. it may be an eight-bit counter (in which case N may be chosen to equal 127).

When, subsequently, the transmission path 1 of FIG. 1 becomes unoccupied, the signal at the input 40 changes to logic "1", enabling gate 44. The resulting logic "1" at the output of gate 44 enables gate 51 and also triggers monostable 47, resulting in a logic "1" being applied to the "load" input L of counter 48, the binary number instantaneously present in counter 46 being transferred to counter 48. Counter 48 is constructed in a similar manner to counter 46 and the output pulse frequency of multivibrator 49 may be, for example, 20 Hz. Counter 48 therefore now counts down in the rhythm of the output pulses from multivibrator 49, starting at a count corresponding to the aforesaid binary number present in counter 46 when the transmission path 1 became unoccupied. When the content of counter 48 reaches zero a logic "1" appears at its "terminal count" output 50, resulting in a logic "1" at the output 41 of delay circuit 37 if and only if the signal at input 40 is still logic "1", i.e. if and only if the transmission path 1 is still unoccupied. It will be seen, therefore, that the longer the time which elapses between the application of a logic "1" request signal to terminal 39 and the subsequent application of a logic "1" "channel free" signal to terminal 40, i.e. the longer the operator has waited, the smaller the binary number will be which is transferred from counter 46 to counter 48, and hence the smaller the subsequent delay will be before the appearance of a logic "1" at the output 50 of counter 48.

If the "channel free" signal on terminal 40 has disappeared by the time the logic "1" appears on output 50 of counter 48, i.e. if another similar transmitter apparatus included in the transmission system has been waiting longer and thus is allowed to occupy the channel 1 first, counter 46 continues to count down and its new contents are transferred to counter 48 in a similar way when the channel again becomes free. If again another transmitter apparatus takes priority the process is repeated yet again, and so on until the transmitter apparatus is allowed to occupy the channel.

The output frequency of multivibrator 45 is chosen, in conjunction with the capacity of counter 46, to be such that the count in counter 46 is unlikely to reach zero before the transmitter apparatus gains the channel. In other words the value chosen for this frequency will depend on how many transmitter apparatuses are included in the system, the average length of the various transmissions, and how often the various transmitter apparatuses request access to the channel. (It will be evident that choosing an excessively low value for this frequency may result in the determination of how long the various transmitter apparatuses have waited being effected with insufficient resolution, and therefore in an increased likelihood that two transmitter apparatuses will be deemed to have waited for equal times and will therefore clash when the channel becomes free.) If the count in counter 46 should reach zero before the transmitter apparatus gains the channel, the resulting appearance of a logic "1" at its terminal count output 58 sets the flip-flop 59, causing a steady logic "1" to be applied by its output to gate 57 and thence to gate 51, so that a logic "1" will appear at the output 41 the next time the channel becomes free, i.e. the next time a logic "1" is applied to terminal 40.

When a logic "1" does appear at terminal 41 this signal is also applied to the "set" input of flip-flop 52 and to the trigger input of monostable multivibrator 53.

Flip-flop 52 therefore applies a logic "1" to the non-inverting input of AND-gate 54 and the inverting input of this gate subsequently becomes logic "0" when the monostable multivibrator 53 relaxes once again. When this occurs AND-gate 54 triggers monostable multivibrator 55, and the output of this monostable multivibrator 55 resets the flip-flops 42, 52 and 59 and causes the counter 46 to be re-loaded with the aforesaid binary number N. The delay circuit 37 is therefore reset to its initial state.

If the press-to-communicate switch 19 of FIG. 1 is released after actuation of delay circuit 37 but before delay circuit 37 subsequently produces a logic "1" at its output 41, i.e. if the operator decides while waiting that, after all, he does not wish to transmit, the NAND gate 61 of FIG. 1 applies a logic "1" to the reset input 60 of delay circuit 37. This logic "1" is transmitted to the monostable multivibrator 55 via the OR gate 63, with the result that delay circuit 37 is also in these circumstances reset to its initial state in a similar way.

Although the apparatus of FIGS. 1 and 2 forms part of a duplex broadcast transmission system, for example a duplex mobile radio system comprising a base station and a plurality of mobile stations, it will be evident that it could alternatively form part, example, for of a wired transmission system, for example for transmitting data to a data processor (corresponding to the aforesaid base station), the part of the apparatus comprising the radio section 9 together with its inputs and outputs 5, 7 and 12 being modified accordingly. As another alternative it could form part of a simplex broadcast transmission system, in which case it will have to be arranged that release of the (now "press-to-talk") switch 19 does not reset the flip-flop 17 but rather that this is done by a separate "terminate communication" switch, that the input 15 of transmitter 2 is fed with the result of an AND operation on the signals at the terminal 22 and the output of flip-flop 17, and that the base station transmits its "busy" tone both when it is receiving a transmission and when its own "press-to-talk" switch is in the actuated state and only transmits its "channel free" tone when neither of these situations have occurred for a predetermined time.

Figure 3:
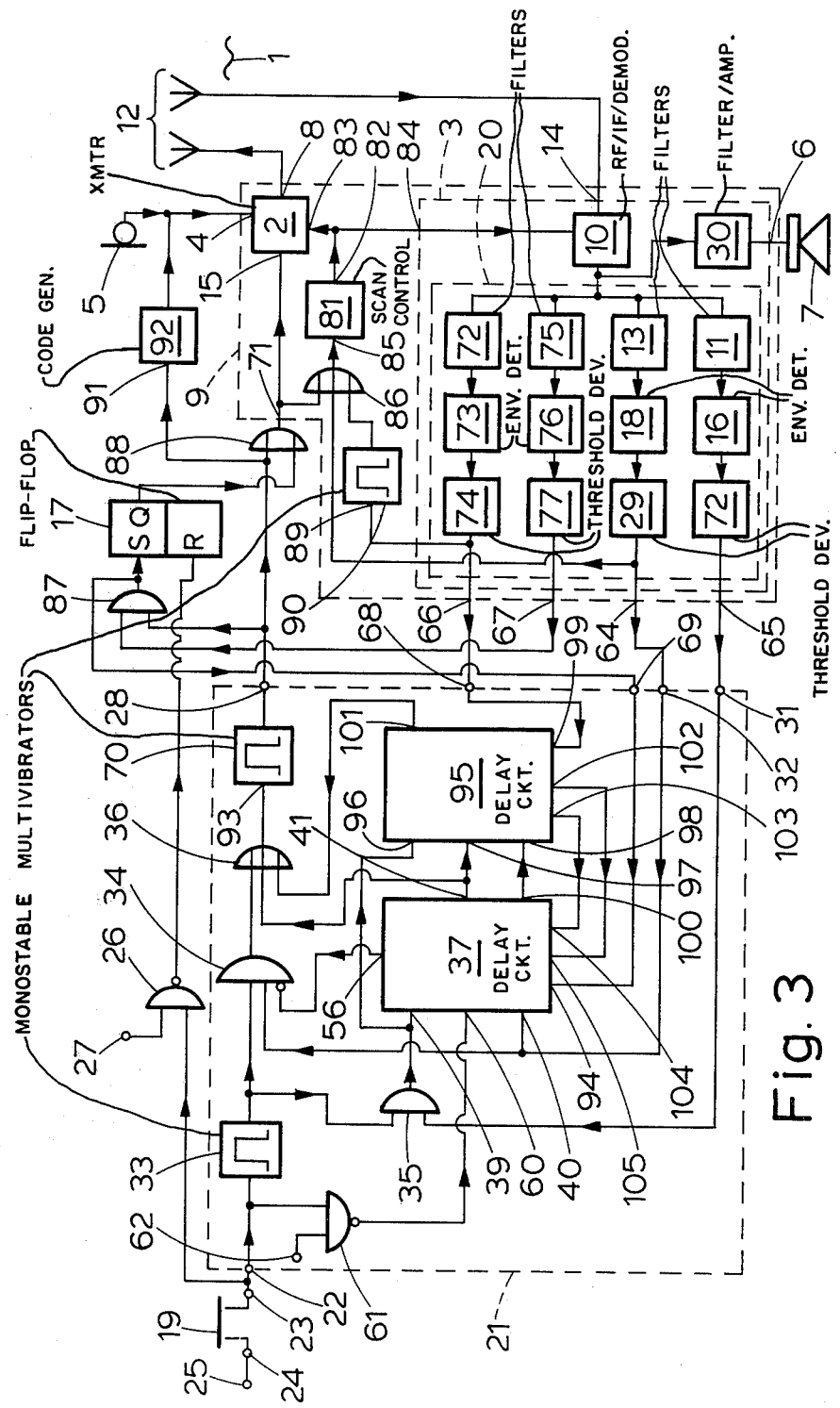
FIG. 3 shows a second embodiment in schematic form.

FIG. 3 shows another transmitter apparatus (which corresponds in part to the apparatus of FIG. 1, similar components in the two Figures being given the same reference numerals) for a duplex information transmission system, which system comprises a plurality of such apparatuses having their outputs coupled to a common transmission path to a base station. In contrast to the system of FIG. 1 however, the common transmission path of the system, of which the apparatus of FIG. 3 forms part, comprises a plurality of individual broadcast channels, each channel comprising a respective first transmission carrier frequency for transmission from the various transmitter apparatuses to the base station and a respective second transmission carrier frequency for transmission from the base station to the various transmitter apparatuses. Transmitters are provided in the base station for transmitting on the respective said second transmission carrier frequencies continuously, and each of these transmitters is provided, similarly to the single base station transmitter referred to while describing the embodiment of FIG. 1, with a carrier modulator to which is coupled the output of a respective microphone and also the outputs of respective first and second audio tone or audio tone combination generators which can be individually activated as alternatives, so that the output signal of each base station transmitter consists at all times of a carrier having the relevant said second transmission carrier frequency and modulated with the output of one of the two relevant tone generators plus any output from the corresponding microphone. When activated, the output signals of all the first audio tone or audio tone combination generators are identical, for example tones of 2.2 kHz, and the output signals of all the second audio tone or audio tone combination generators are also identical, for example tones of 2.7 kHz. The base station also includes an individual receiver corresponding to each broadcast channel and tuned to the relevant first transmission carrier frequency. In a similar way to the single base station receiver referred to while describing the embodiment of FIG. 1, outputs of each of these base station receivers are coupled to activation signal inputs of the two tone generators which are coupled to the base station transmitter corresponding to the relevant channel, and this in such manner that, when a carrier is being received by a given base station receiver, (corresponding channel "busy") the relevant first tone generator is activated so that the corresponding base station transmitter transmits its carrier (having the relevant said first transmission frequency) modulated with the output of the relevant first tone generator (plus any output from the relevant microphone), and when a carrier is not being received by a given base station receiver (corresponding channel "free") the relevant second tone generator is activated so that the corresponding base station transmitter transmits its carrier modulated with the output of the relevant second tone generator (plus any output from the relevant microphone). Thus at all times the base station transmits carriers on all the second transmission carrier frequencies, each carrier being modulated with a tone indicative of whether or not the relevant channel is free.

The transmitter apparatuses of the system (which are each constructed as shown in FIG. 3) each include, in a radio section 9, an indicator circuit similar in part to the circuit 20 of FIG. 1, the filters 72 and 29 of each circuit 20 being tuned to the output frequencies of the first tone generators and the second tone generators, respectively, in the base station. However, in contrast to the transmitter apparatus of FIG. 1, the radio section 9 of the apparatus of FIG. 3 is constructed to cyclically scan the various broadcast channels in succession when in the idling state, i.e. to tune its transmitter section 2 and receiver section 3 to the aforesaid first and second transmission carrier frequencies, respectively, of one channel, then to the first and second transmission carrier frequencies, respectively, of another channel, and so on, for all the channels and then to repeat the whole cycle, etc. This scan is carried on until the receiver 3 detects that the channel it is at present tuned to its free, resulting in a logic "1" from the threshold device 29. When this occurs this logic "1" is used to inhibit the scanning process, so that the radio section remains on the "free" channel. If this channel subsequently becomes occupied by another transmitter apparatus of the system the logic "1" disappears and the scanning cycle is continued until another free channel is detected, and so on. The above process, which is conventional (see, for example, "IEEE Transactions on Vehicular Technology" Volume VC-12, September 1963 pages 32–38 and "IEEE Transactions on Vehicular Communications" Volume VC-13, September 1964, pages 70–74) is carried out by a control means 81 the output 82 of which is connected to tuning control inputs 83 and 84 of the transmitter section 2 and the receiver section 3, respectively. A control input 85 of control means 81 is connected to the output of an OR gate 86; the application of a logic "1" to this input inhibits the scanning process carried out by the control means 81. One input of OR gate 86 is fed from the output 64 of threshold-responsive device 29 (at which a logic "1" appears when the radio section 9 is on a free channel).

Similarly to the apparatus of FIG. 1, the outputs 64 and 65 of the indicator circuit 20 of FIG. 3 are connected to the inputs 32 and 31, respectively, of the control circuit 21. The indicator circuit 20 of FIG. 3 also includes two further filter/envelope detector/threshold-responsive device combinations 72, 73, 74 and 75, 76, 77 respectively, each of these combinations being similar to the combinations 11, 16, 72 and 13, 18, 29, the filters 72 and 75 being tuned to frequencies which are different from each other and from the frequencies to which the filters 11 and 13 are tuned. Thus a logic "1" will appear at the output 66 of threshold device 74 if and only if a carrier is received modulated with a tone to which filter 72 is tuned, and a logic "1" will appear at the output 67 of threshold device 77 if and only if a carrier is received modulated with a tone to which filter 75 is tuned. The significance of these further combinations will become apparent below. The output 66 of threshold device 74 is connected to an input 68 of control circuit 21 and the output 67 of threshold device 77 is connected to one input of an AND gate 87. The other input of AND gate 87 is connected to the output 28 of control circuit 21 and the output of gate 87 is connected to the set input of flip-flop 17 and to an input 69 of control circuit 21. The non-inverting output of flip-flop 17 is connected to the activation signal input 15 of transmitter section 2 via an OR gate 88 and an input terminal 71 of radio section 3. The output 28 of control circuit 21 is also coupled to the activation signal input 15 of transmitter section 2 via another input of OR gate 88. Within the radio section 9 the output of threshold device 74 is coupled to the trigger input 89 of a monostable multivibrator 90, the output of which is connected to the control input 85 of scanning control means 81 via another input of OR gate 86. The output 28 of control circuit 21 is also coupled to an activation signal input 91 of a code generator 92. The output of generator 92 is coupled to the modulation signal input 4 of transmitter section 2.

Control circuit 21 differs from its counterpart in FIG. 1 in that the output of OR gate 36 is not coupled to the output 28 directly but is coupled to the control input 93 of a monostable multivibrator 70, the output of which is connected to the output 28; in that the input 69 is connected to a further input 94 of delay circuit 37; and in that a second delay circuit 95 is also provided, inputs 96, 97, 98, and 99 of which are fed from the output of AND gate 35, the output 41 of delay circuit 37, a further output 100 of delay circuit 37, and the input 68, respectively, and outputs 101, 102 and 103 of which feed a further input of OR gate 36, a further input 105 of delay circuit 37, and a further input 104 of delay circuit 37, respectively.

The basic operation of the apparatus of FIG. 3 is similar to that of FIG. 1, the signals at the outputs 64 and 65 of radio section 9 being logic "1" and logic "0", respectively, if the control means 81 is holding the transmitter section 2 and receiver section 3 on a free channel, and being logic "0" and logic "1", respectively, if the control means 81 is in the process of causing the tuning of the transmitter 2 and receiver 3 sections to scan over busy channels in order to find a free one. If press-to-communicate switch 19 is operated while the radio section 9 is on a free channel, i.e. while the signal applied to input 32 of control circuit 21 is logic "1", the resulting pulse from monostable multivibrator 33 (the length of which is chosen to be approximately equal to the time taken for control means 81 to complete a scan of all the channels if all are busy) will be transmitted by gate 34 (the signal on the inverting input of this gate is normally logic "0") to the monostable multivibrator 70 via gate 36, resulting in a logic "1" pulse being applied to the output 28 of control circuit 21. This pulse is then applied to the activation signal inputs of the transmitter section 2 (via gate 88) and the code generator 92, and to the lower input of gate 87. Code generator 92 is constructed to produce, in response to the application of a logic "1" to its input 91, an output signal consisting of a succession of binary bits, the particular bit combination chosen being specific to the particular transmitter apparatus of which the generator 92 forms part. This succession of bits is therefore applied to the modulation signal input 4 of the now activated transmitter section 2 and is transmitted by the aerial system 12 to the base station. The base station decodes the bit combination and treats it as a "transmit request" signal. In response thereto the relevant first tone generator (see previously) in the base station is activated and the relevant second tone generator is deactivated. Each transmitter in the base station also has the outputs of third and fourth individually activatable tone or tone combination generators coupled to its modulation signal input, the output signals of these generators corresponding to the frequencies to which the filters 75 and 72 respectively are tuned. The relevant third tone generator is also activated momentarily in response to the receipt by the base station of the aforesaid request signal, so that the result of the transmission of the request signal by the apparatus of FIG. 3 is that the "channel free" signal at output 64 of radio section 9 changes from logic "1" to logic "0", the "channel busy" signal at output 65 changes from logic "0" to logic "1" (preventing other transmitter apparatuses of the system from breaking into the relevant channel) and the signal at output 67 (a "request accepted" signal) changes momentarily from logic "0" to logic "1". The duration of the output pulse of monostable multivibrator 70 is chosen sufficiently long that this pulse will still be present when the aforesaid changes at the outputs 64, 65 and 67 take place, so that both inputs of AND gate 87 are logic "1" and a logic "1" is applied to the set input of flip-flop 17. The resulting logic "1" at the output of flip-flop 17 keeps transmitter section 2 activated (via gate 88) and scanning means 81 inhibited, so that transmission can then occur via microphone 5. This situation continues until press-to-communicate switch 19 is released, resetting flip-flop 17 via inverter 26 and thus restoring the apparatus to its initial state. The base station responds to the cessation of transmission by transmitter section 2 by deactivating the relevant first tone generator and activating the relevant second tone generator.

If press-to-communicate switch 19 is actuated while the radio section 9 is scanning the (busy) channels, i.e. while the signal applied to input 31 of control circuit 21 is logic "1", the resulting pulse from monostable 33 results in a logic "1" at the input 39 of delay circuit 37, which then proceeds to operate in a similar manner to the corresponding circuit of FIG. 1, i.e. it produces a pulse at its output 41 a given time interval after the scanning process carried out by means 81 subsequently results in the radio section 9 becoming tuned to a free channel (producing a logic "1" at terminal 32 of control circuit 21 and hence at input 40 of delay circuit 37) this given time interval being shorter the longer the time has elapsed between the actuation of press-to-talk switch 19 and the scanning means 81 subsequently finding a free channel. Moreover, the pulse occurs at the output 41 only if the channel is then still free. When this pulse occurs, it is applied to the trigger input of monostable 70 and thus initiates a chain of events similar to that described above in relation to the "channel free" situation.

It will be appreciated that, if the operators of two transmitter apparatuses of the system actuate their press-to-communicate switches 19 at approximately the same time while all channels are busy, the parts of the delay circuits 37 of the two apparatuses which measure the subsequent time interval which elapses before a channel becomes free (c.f. multivibrator 45 and counter 46 of FIG. 2) may be incapable of resolving the difference between these time intervals for the two apparatuses, with the result that the control circuits 21 of both apparatuses produce pulses at their outputs 28 at the same time, and hence in the base station receiving "transmit request" signals from both apparatuses simultaneously. Considering for the moment, the delay circuit of FIG. 2, it will be appreciated that the resolution cannot be improved indefinitely by chosing higher and higher output frequencies for multivibrator 45 and correspondingly higher and higher capacities for counter 46 because the latter will require higher and higher capacities for counter 48, and hence in very wasteful longer and longer possible delays before the delay circuit produces its output pulse. (There is an upper limit on the output frequency of multivibrator 49 because, if the periods of this output signal and of the output signals of the corresponding multivibrators of the other apparatuses of the system were appreciably shorter than the time which elapses between the production of an output pulse by a given delay circuit 37 and the resulting occurrence of a logic "0" at the "channel free" outputs 64 of the radio sections of the various apparatuses of the system, there would be a considerable likelihood that, after the activation of the transmitter section 2 of one waiting apparatus of the system when the transmission path becomes free, the transmitter section 2 of another apparatus of the system which has also been waiting but for a shorter time will also become activated before the logic "0" occurs at the output 64 of its radio section.) The apparatus of FIG. 3 is provided with the second delay circuit 95 and with the filter/envelope-detector/threshold-responsive device combination 72, 73, 74 in its indicator circuit 20 in order to determine the correct priority when such clashes occur.

If the control circuits 21 of two apparatuses as shown in FIG. 3 both produce an output pulse simultaneously, i.e. if the resolution in each delay circuit 37 is insufficient to allow the difference between the times for which the two operators have been waiting to be determined, both apparatuses will transmit their respective codes (generated by their code generators 92) to the base station simultaneously. The base station will activate its corresponding first tone generator with the result that the signals at the outputs 64 and 65 of the radio sections 9 become logic "0" and logic "1" respectively. However the base station will not be able to actually decode the two simultaneous request signals, merely to sense that they are actually present, and the base station is constructed to respond to this situation by refraining from actuating the corresponding third tone generator but activating the corresponding fourth tone generator instead. The result is that the signal at the "request accepted" outputs 67 of the radio sections 9 remain logic "0" but the signal at the outputs 66 thereof become logic "1" ("signals clashed"), which logic "1"s are applied to the inputs 99 of the second delay circuits 95 of the two apparatuses. Delay circuit 95 is similar in many respects to the delay circuit 37 but the wait-determining portion thereof (c.f. items 45 and 46 of FIG. 2) is constructed to operate with increased resolution. Thus the counter in delay circuit 95 corresponding to counter 46 in delay circuit 37 may have a capacity of eight times that of the corresponding counter in delay circuit 37 and the multivibrator in delay circuit 95 corresponding to multivibrator 45 in delay circuit 37 may be constructed to generate an output signal having a frequency which is eight times the frequency of the output signal of the corresponding multivibrator in delay circuit 37.

Delay circuit 95 is, similarly to delay circuit 37, activated by the output of gate 35, (which is applied to its input 96), i.e. when press-to-communicate switch 19 is actuated when the radio section 9 is scanning the (busy) channels. However, its input which corresponds to the "on free channel" input 40 of delay circuit 37 is constituted by the two inputs 99 and 97, which are fed with the "signals clashed" signal from output 66 of radio section 9 and with the output signal at terminal 41 of delay circuit 37, respectively. An AND function is performed on these two signals in delay circuit 95, with the result that the count in the counter in circuit 95 which corresponds to counter 46 in FIG. 2 is only transferred to the counter therein which corresponds to counter 48 in FIG. 2 when the "signals clashed" signal occurs, and only then provided that delay circuit 37 is producing an output (to prevent the delay circuits 95 in apparatuses which have not already produced a request signal from also being triggered by the "signals clashed" signal). The result is that the delay circuits 95 in the two (or more) apparatuses whose request signals have clashed are activated to subsequently produce logic "1"s at their outputs 101 (which feed the OR gates 36). The first circuit 95 to generate such a signal causes the corresponding monostable 70 to be triggered, resulting in the activation of the generator 92 and the consequent transmission of a second request signal to the base station. (The scanning means 81 of the apparatuses whose signals have clashed have in the meantime been inhibited by output pulses from the relevant monostables 90, triggered by the outputs of the corresponding threshold devices 74.)

The base station is constructed to respond to the receipt of this second request signal by de-activating the relevant aforesaid fourth tone generator and activating the relevant aforesaid third tone generator, with the result that the signals at the outputs 66 and 67 of the radio sections 9 in the apparatuses whose request signals have clashed become logic "0" and logic "1" respectively. The change to logic "0" of the signal at the output 66 in the apparatus which has not yet been activated to transmit a second request signal prevents the corresponding delay circuit 95 from subsequently producing an output, and the change to logic "1" of the signal at the output 67 in the apparatus which has produced a second request signal results in the corresponding flip-flop 17 being changed to the set state, so that the apparatus of which it forms part gains the channel. The logic "1" at the output 67 is, in the apparatus which produces a second request signal, also applied to the input 94 of the delay circuit 37 via gate 87 and causes the various flip-flops and counters therein to be reset to their initial state, and a logic "1" to appear at the output 100 thereof. This logic "1", applied to input 98 of the corresponding delay circuit 95, similarly causes the various counters and flip-flops in delay circuit 95 to be reset.

The production of a logic "1" at the output 41 of delay circuit 37 normally also results in the subsequent resetting of the counters and flip-flops in this delay circuit 37 (c.f. the action of the components 52-55 and 63 of FIG. 2) and in the production of a logic "1" at the output 100, and hence in the resetting of the flip-flops and counters in delay circuit 95. If, however, a logic "1" should appear at the "signals clashed" output 66 of radio section 9 in response to the logic "1" at the output 41, and hence in the activation of delay circuit 95, a logic "1" appears at the output 103 of delay circuit 95 and is applied to input 104 of delay circuit 34. This logic "1" inhibits the resetting of the flip-flops and counters in delay circuit 37 and the production of the logic "1" at the output 100 thereof. When, subsequently, delay circuit 95 produces a logic "1" at its output 101, (by which time the logic "1" at its output 103 has disappeared) this also results in the subsequent production of a logic "1" at its output 102 and hence at the input 104 of delay circuit 37. This logic "1" causes the flip-flops and counters in delay circuit 37 to be reset, a logic "1" to appear at its output 100, and therefore in the resetting of the various counters and flip-flops in delay circuit 95.

Figure 4:
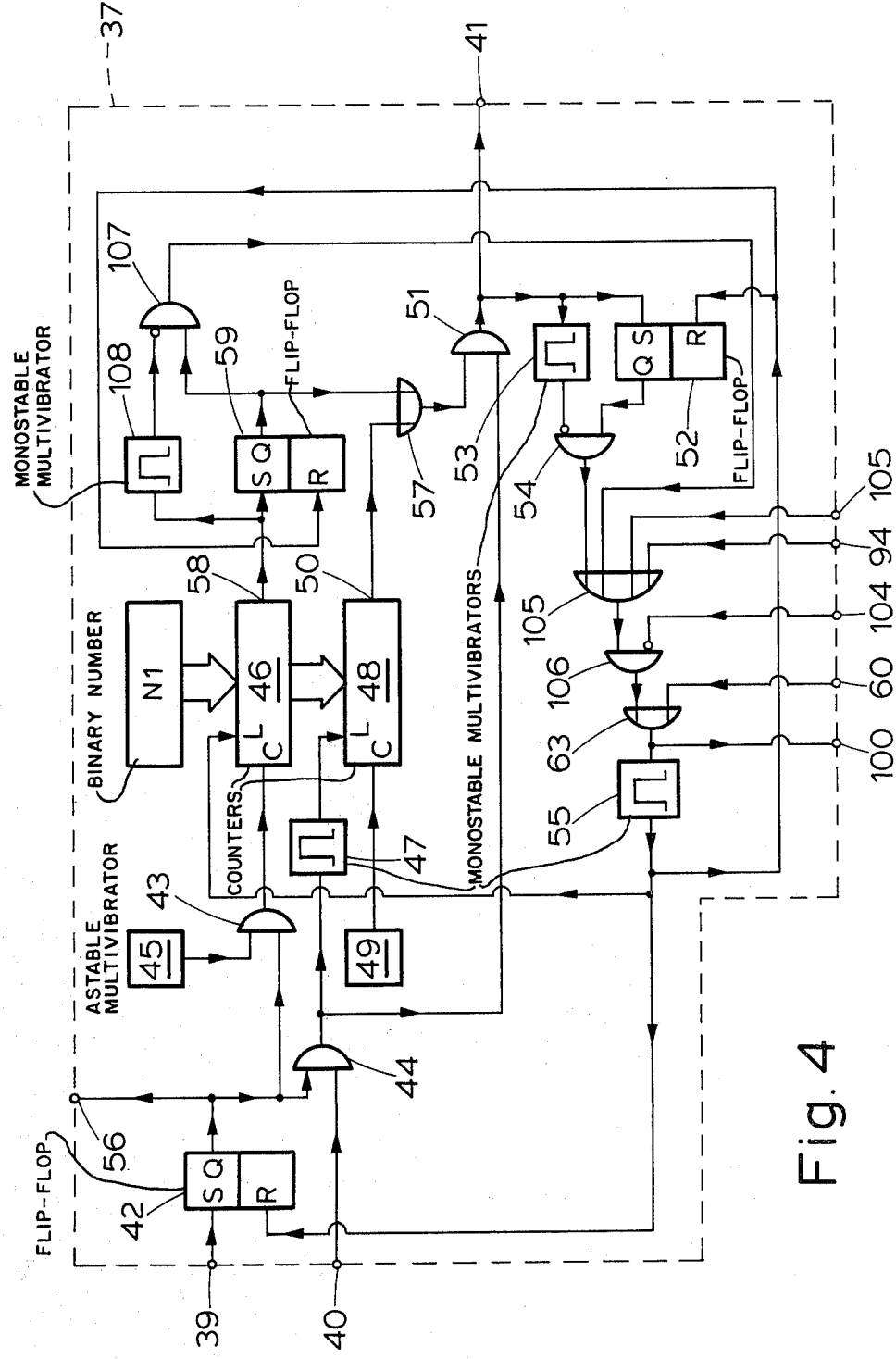
FIG. 4 shows part of the embodiment of FIG. 3 in more detail.
Figure 5:
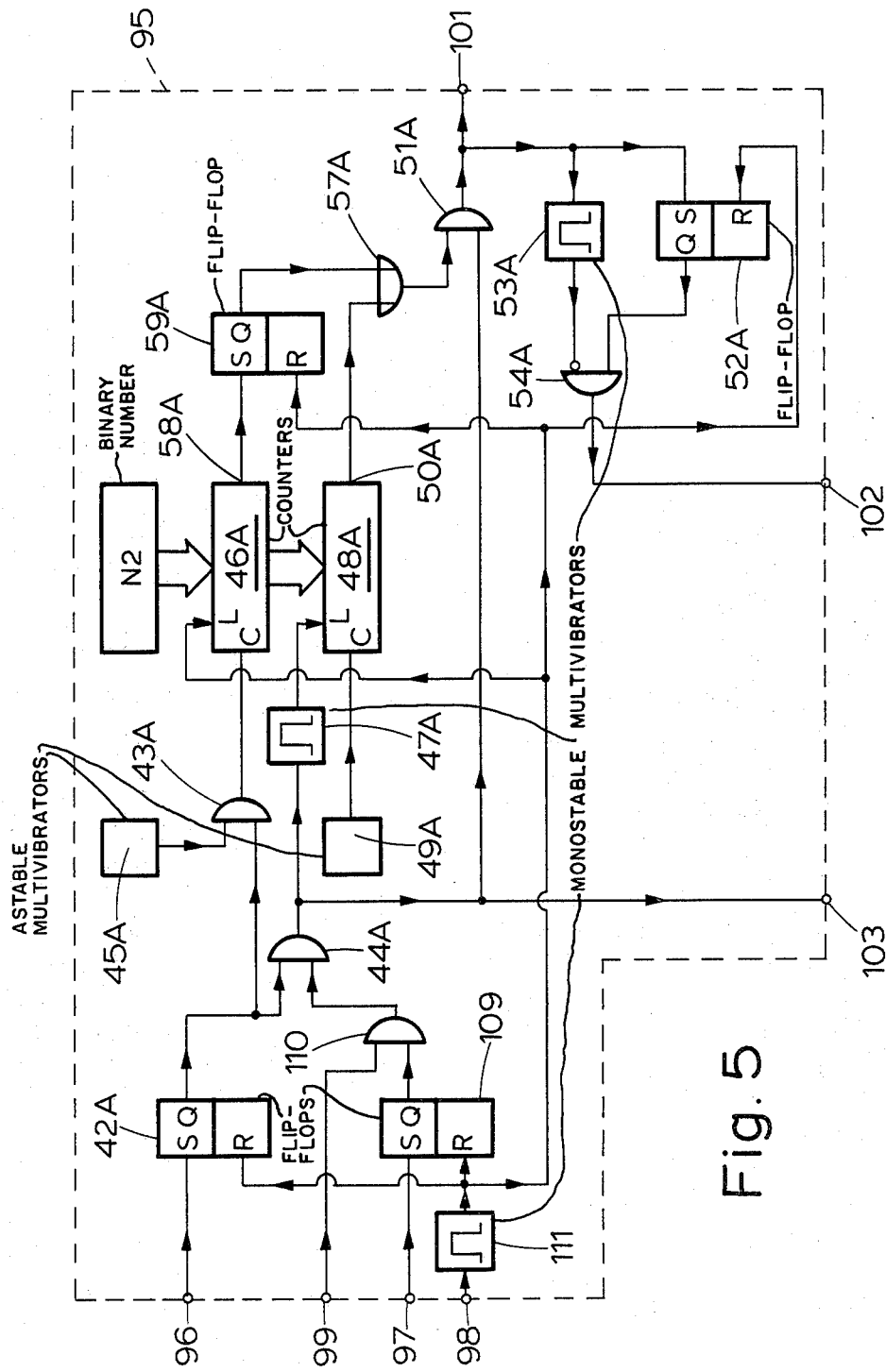
FIG. 5 shows another part of the embodiment of FIG. 3 in more detail.

FIGS. 4 and 5 show possible construction for the delay circuits 37 and 95, respectively, of FIG. 3, the various inputs and outputs of these circuits being given the same references as in FIG. 3.

In FIG. 4 delay circuit 37 of FIG. 3 corresponds in the main to the delay circuit 37 of FIG. 2 and, where possible, components in the circuit of FIG. 4 have been given the same references as their counterparts in FIG. 2. In the delay circuit of FIG. 4 an OR gate 105 and an AND gate 106 are provided in that order between the output of AND gate 54 and OR gate 63. Further inputs of OR gate 105 are fed from the terminals 94 and 105 from the output of a further AND gate 107, respectively. AND gate 106 is provided in order that the generation of a reset pulse by monostable multivibrator 55, except in response to an output from NAND gate 61 of FIG. 3, will be inhibited while delay circuit 95 of FIG. 3 is activated, i.e. while a logic "1" is present at output 103 of delay circuit 95. To this end an inverting input of AND gate 106 is fed from the terminal 104. (The astable period of monostable multivibrator 53 is chosen sufficiently long that a pulse will not appear at the output of AND gate 54, in response to the occurrence of a logic "1" at output 41 in a "signals clashed" situation, until after the signal at terminal 104 has itself become logic "1" in response to the pulse at output 41.)

Non-inverting and inverting inputs of AND gate 107 are fed from the output Q of the flip-flop 59 and from the output of a further monostable multivibrator 108 respectively. The trigger input of monostable multivibrator 108 is fed from the terminal count output 58 of counter 46. The components 107 and 108 are provided to apply a logic "1" to the OR gate 105, and hence reset the delay circuit to its initial state, if a free channel should not be found by the radio section 9 of FIG. 3 within a given time of the counter 46 reaching its final count. This is done in order to prevent the delay circuit 37 from locking the apparatus out if a "channel free" signal should not get through to it from the base station, for example because of noise in the channel. The astable period of multivibrator 108 may be, for example, one minute.

In FIG. 5 delay circuit 95 of FIG. 3 corresponds largely to delay circuit 37 as shown in FIG. 4, and components of FIG. 5 which correspond to those of FIG. 4 have therefore been given the same references as their counterparts in FIG. 4 but with the suffix "A". As mentioned previously, the capacity of counter 46A of FIG. 5 is larger, for example eight times larger, than that of counter 46 in FIG. 4. Moreover, the output frequency of multivibrator 45A of FIG. 5 is higher, for example eight times higher, than that of multivibrator 45 of FIG. 4.

In addition to components corresponding to components of the delay circuit 37 of FIG. 4, delay circuit 95 of FIG. 5 includes a set-reset flip-flop 109, an AND gate 110 and a monostable multivibrator 111. As terminal 97 is fed from the output 41 of the delay circuit 37, flip-flop 109 will be set when delay circuit 37 produces an output. If this output should result in the transmission of a "signal clashed" signal by the base station, terminal 99 will be fed with a logic "1" and gate 110 will produce a logic "1". This results in a logic "1" at the output of gate 44A (flip-flop 42A has already been set by actuation of the press-to-talk switch 19 of FIG. 3) and hence in (a) a logic "1" reset-inhibit signal at terminal 103 for delay circuit 37 and (b) the loading of the instantaneous contents of counter 46A into counter 48A. These contents are representative of the time which elapsed between the actuation of the press-to-talk switch 19 and the appearance of the "signals clashed" signal, and are hence also representative of the time which elapsed between said actuation and the appearance of the "on free channel" signal. If, when a logic "1" subsequently appears at the terminal count output 50A of counter 48A, the "signals clashed" signal is still present at terminal 99, gate 51A will apply a logic "1" to output terminal 101. As mentioned previously, this results in the removal of the "signals clashed" logic "1" at the terminal 99 and thus in the removal of the inhibit signal at terminal 103, and results moreover in a "request accepted" signal being applied to terminal 94 of the delay circuit 37 of FIG. 4. This latter signal results in a logic "1" at the terminal 100 of the circuit of FIG. 4 and thus at terminal 98 of the circuit of FIG. 5. Monostable 111, the output of which is connected to the reset inputs of the flip-flops 109, 42A, 52A and 59A, and to the load input of counter 46A therefore restores the circuit of FIG. 5 to its original state, a similar operation being carried out in the circuit of FIG. 4 by the output of monostable 55.

It will be appreciated that, although it is unlikely that the delay circuit 95 will produce an output at the same instant as its counterpart in the other transmitter apparatus, the request signal of which has clashed with the request signal of the transmitter apparatus of FIG. 3, it is still possible that this might occur. In order to resolve such a conflict a further delay circuit similar to circuit 95 but capable of higher resolution may be provided, this further delay circuit being activated from the output of delay circuit 95 and the "signals clashed" signal in the same manner that delay circuit 95 is activated by the output of delay circuit 37 and the "signals clashed" signal.

It has been assumed up till now that, when a channel becomes free while several apparatuses constructed as described with reference to FIGS. 3–5 are waiting, a logic "1" will appear at the output terminals 64 of the radio sections 9 of all the waiting apparatuses simultaneously. In fact this is not likely to be the case, because the scans of the various channels carried out by the scanning means 81 of the various apparatuses will not normally be synchronised with each other. The result of this is that an apparatus which has been waiting the longest might not necessarily gain the channel, because the count in its counter 46 might not be transferred to its counter 48 until after this operation has occurred in another waiting apparatus. In order to overcome this problem a further AND gate may be included in the connection in FIG. 3 between the output 64 of radio section 9 and the input 32 of control circuit 21, a second input of this AND gate being fed from a further filter-/envelope detector/threshold device combination (similar to the combinations 11, 16, 72, 13, 18, 29 etc) then included in indicator circuit 20. If the base station is caused to transmit in the relevant channel a tone to which the filter in this further combination is tuned a predetermined time interval after it transmits the "channel free" tone, this time interval being sufficient to allow the scanning means 81 in all the apparatuses to "find" the free channel, a logic "1" will be applied to the terminal 32 of the control circuits of all the apparatuses simultaneously, causing the contents of the counters 46 of all the waiting apparatuses to be transferred to their counters 48 simultaneously.

It will be evident that the apparatus of FIGS. 3–5 may be modified in a manner such as to make it suitable for use in a simplex transmission system in an analogous way to that described for the apparatus of FIGS. 1 and 2.

It will be evident that the function of the control circuits 21 of FIGS. 1 and 3 may alternatively be performed by a suitably programmed digital signal processing system, for example a so-called "microcomputer system". Such a system is shown diagrammatically in FIG. 6, and will be assumed to be programmed to perform the function of the control circuit 21 of FIG. 3. The system comprises a so-called microprocessor together with associated program storage, these collectively being denoted by a block 112, and two astable multivibrators 114 and 115 constructed to generate output pulses at frequencies of, for example, 16 Hz and 20 Hz respectively. The microprocessor/storage combination 112 has inputs 22, 31, 32, 68, 69 and an output 28 which correspond to those of the control circuit 21 of FIG. 3 which have the same references, and three further inputs 113, 116 and 117, respectively. The inputs 116 and 117 are fed from the outputs of the multivibrators 114 and 115, respectively, and are coupled to external event counters C1 and C2, respectively, in the combination 112 in such manner that the content of each counter is incremented by each output pulse from the corresponding multivibrator 114 or 115. The input 113 constitutes an "external interrupt" terminal in known manner; a logic "1" applied to this terminal causes the combination 112 to enter an "idling" program loop regardless of whatever operations are being carried out in the combination at the relevant time. In fact when the system of FIG. 6 is used to replace the control circuit 21 of FIG. 3 the apparatus of FIG. 3 will have to be modified slightly so that the reset or cancel request function obtained by means of the inverter 61 on release of the press-to-talk switch 19 will be achieved instead by actuation of a further switch (not shown) constructed to apply a logic "1" to terminal 113 of FIG. 6.

Figure 6:
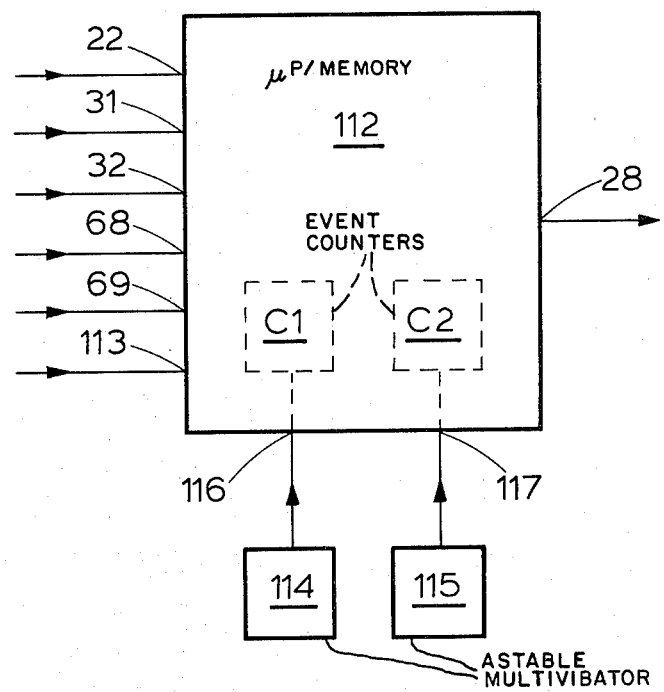
FIG. 6 shows an alternative for part of the embodiment of FIG. 3
Figure 7A:
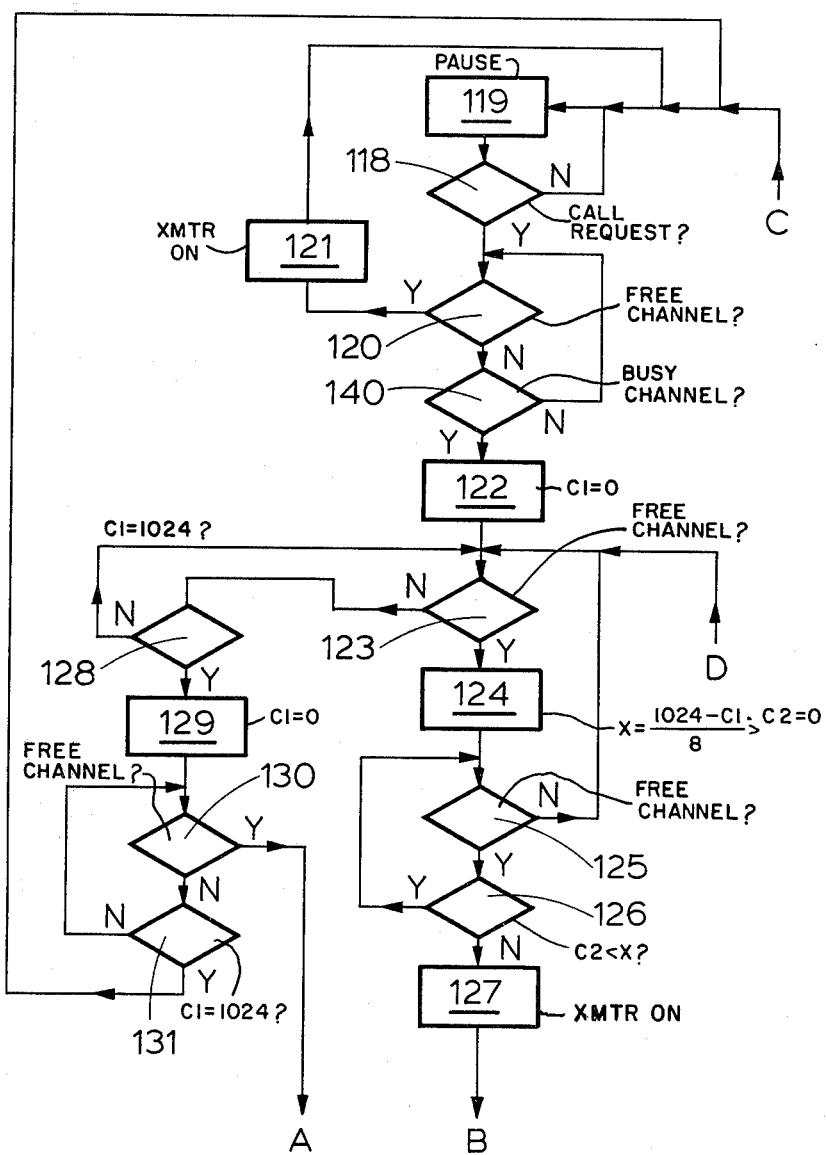
FIG. 7 is a flow chart showing the operations carried out in the alternative of FIG. 6.
Figure 7B:
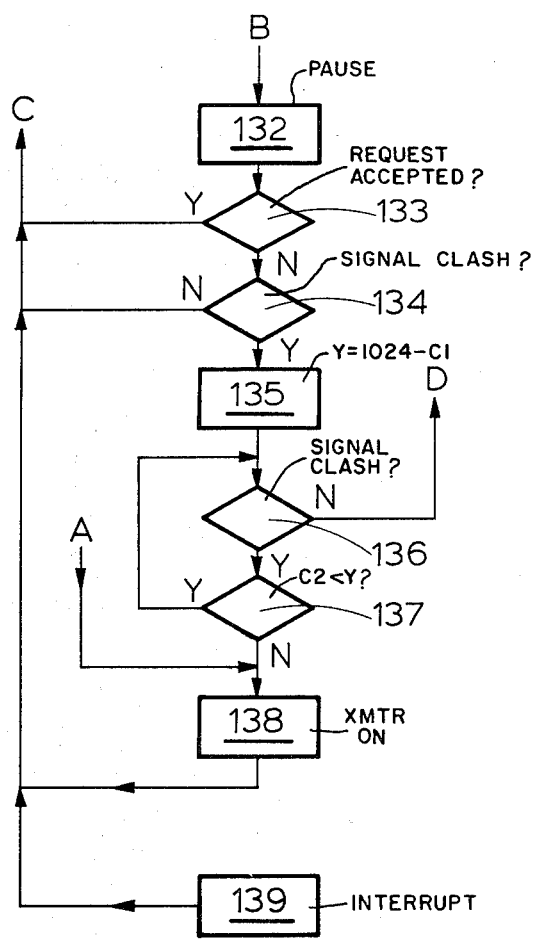

The microprocessor/storage combination 112 of FIG. 6 is programmed to perform the operations shown in the flow chart of FIG. 7 unless, as mentioned previously, the sequence of operations is modified by the application of a logic "1" to terminal 113 by the aforementioned further switch. The points A and B in FIG. 7B are continuations from the points A and B, respectively, in FIG. 7A and the points C and D in FIG. 7A are continuations from the points C and D, respectively, in FIG. 7B. The paths marked "Y" and "N" from the various decision operations in FIG. 7 are the paths taken when the answers to the question posed in the corresponding operation are "yes" and "no", respectively. The various operations 118–140 of FIG. 7 are listed in the following table:

| Operation number | Operation |
|---|---|
| 118 | Call requested? (Is signal at terminal 22 logic "1"?) |
| 119 | Fixed pause, possibly involving the performance of further operations. |
| 120 | On free channel? (Is signal at terminal 32 logic "1"?) |
| 121 | Momentarily produce logic "1" at terminal 28. |
| 140 | Channels busy? (Is signal at terminal 31 logic "1"?) |
| 122 | Set contents of counter C1 to zero. |
| 123 | On free channel? |
| 124 | Subtract contents of counter C1 from 1024 and divide result by 8. Store result of division step. Set contents of counter C2 to zero. |
| 125 | On free channel? |
| 126 | Is the count in counter C2 less than the number stored during operation 124? |
| 127 | Momentarily produce logic "1" at terminal 28. |
| 128 | Is the content of counter C1 greater than or equal to 1024? |
| 129 | set content of counter C1 to zero. |
| 130 | On free channel? |
| 131 | Is the content of counter C1 equal to 1024? |
| 132 | Fixed pause for time needed to receive base station response. |
| 133 | Request accepted? (Is signal at terminal 69 logic "1"?) |
| 134 | Signals clashed? (Is signal at terminal 68 logic "1"?) |
| 135 | Subtract content of counter C1 from 1024 and store result. Set content of counter C2 to zero. |
| 136 | Signals clashed? |
| 137 | Is the content of counter C2 less than the number stored during operation 135? |
| 138 | Momentarily produce logic "1" at terminal 28. |
| 139 | Jump to interrupt routine in response to a logic "1" at terminal 113. |

The loop in FIG. 7 containing only the operations 118 and 119 constitutes the aforementioned idling program loop, and results in the signal at terminal 22 being checked at intervals the frequency of which is determined by the pause produced in operation 119. When a logic "1" (transmit-request signal) is applied to terminal 22, an activation signal for the transmitter is produced (operation 121) if the radio is on a free channel ("yes" from operation 120). Otherwise it is checked (operation 140) whether a "busy" signal is present (which will normally be the case). If it is not, for example because of interference in the transmission path from the base station, the loop containing the operations 120 and 140 is repeatedly traversed until either a "channel free" or a "busy" signal occurs.

If the "busy" signal is present the delay sequence is put into effect. The content of counter C1 is set to zero (operation 122) and so starts to count the delay before a "channel free" signal occurs, the program loop including the operations 123 and 128 being cycled repeatedly until either the content of counter C1 reaches 1024 or the "channel free" signal appears. If the content of counter C1 reaches 1024 before the "channel free" signal appears the contents of counter C1 are set to zero again and the sequence enters the loop comprising the operations 130 and 131. If a channel then becomes free before the count in counter C1 reaches 1024 for the second time, i.e. within the next 64 seconds with the output frequency of multivibrator 114 quoted, an activation signal is transmitted immediately (operation 138). If, on the other hand, no channel becomes free within this period the sequence returns to the idling loop 118, 119.

If the "channel free" signal appears while the sequence is in the loop 123, 128, operations 124 are performed (in which the division step may be carried out by ignoring the three least significant bits of the count in counter C1 and treating the remaining bits in such manner that their original significances are shifted three places in the direction of less significance), after which the sequence enters the loop 125, 126. The sequence remains in this loop until the count in counter C2 reaches the number stored in operation 124, i.e. for a time T which is smaller, the longer the time which elapsed between the application of the logic "1" to the terminal 22 and the subsequent appearance of the "channel free" signal, unless the "channel free" signal disappears before the end of this time, i.e. unless another transmitter apparatus in the system gains the channel in the meantime. If the latter happens the sequence returns to operation 123 and the wait continues. If this latter does not happen a transmission activation signal (logic "1" at output 28) is produced at the end of the time T (operation 127) and if, after the pause created in operation 132, the "request accepted" signal is appearing on terminal 69, the sequence returns to the idling loop 118, 119. This is also the case if neither the "request accepted" signal nor the "signals clashed" signal (terminal 66) is appearing at this time, for example because the "transmit request" signal failed to get through to the base station (operation 134).

If the "signals clashed" signal is appearing at this time the operations 135 are carried out and the sequence enters the loop 136, 137, in which it remains until the content of counter 137 reaches the number stored during operation 136, unless the "signals clashed" signal disappears in the meantime, i.e. unless another transmitter apparatus within the system the request signal from which has clashed with the request signal from the apparatus under consideration gains the channel in the meantime. If the latter happens, the sequence returns to operation 123 and the wait continues. If on the other hand this does not happen, a transmission activation signal is produced at terminal 28 when the content of counter C2 reaches the number stored during operation 135 (operation 138). In the same way as with operation 127, the time the sequence remains in the loop 136, 137 before operation 138 occurs will be less, the longer the time which elapsed between the actuation of the press-to-talk switch 19 and the subsequent appearance of the "channel free" signal, because the number stored during operation 135 will be smaller, the longer this elapsed time was. Because no divide-by-eight step was carried out during operation 135 the time resolution with which the operation 138 is carried out is, however, approximately eight times that with which the operation 127 was carried out. (In effect, with the output frequency quoted for multivibrator 114, the divide-by-eight step in operation 124 reduces the count rate of counter C1 from 16 Hz to 2 Hz as far as the immediately succeeding operations are concerned.)

It should be noted that if, when operations 135 are carried out, the count in counter C1 has already reached or exceeded 1024 the number stored during operation 135 will be zero or negative and in either case this will result in no complete traversals of the loop containing operations 136 and 137 taking place, i.e. in the operation 138 taking place with substantially zero delay.

It should also be noted that, if the operations 128 and 131 are carried out using the numerical values quoted, (other numerical values may alternatively be used, provided that used in operation 128 is also used as the number from which the content of counter C1 is subtracted in the operations 124 and 135) the counter C1 will have to be an 11-bit counter at the least. If it were only a 10-bit count the next counter after 1023 would be 0 and the operations 128 and 131 would always give an answer "no". If the "signals clashed" signal appears, the implication is that the result of the division step in operation 124 in those apparatuses whose signals have clashed was the same for each such apparatus. This means that any difference in the times these apparatuses had been waiting was represented only in the three least significant bits of the counts in the respective counters C1. It will be evident, therefore, that the subtraction step in operation 135 may be replaced, with no loss of accuracy, by a step in which the number represented by the four least significant bits in counter C1 is subtracted from sixteen. This alternative can facilitate the rapid resolution of the "signals-clashed" situation.

Although the delays produced by the particular forms of the control circuits 21 of FIGS. 1 and 3 described with reference to FIGS. 2, 4, 5, 6 and 7 bear a linear inverse relationship to the time elapsing between the actuation of the press-to-communicate switch 19 and the transmission path subsequently becoming unoccupied, it will be appreciated that this linear inverse relationship is not essential and another form of inverse relationship may alternatively be arranged to occur. Thus, for example, a binary rate multiplier may be included between the multivibrator 45 and the counter 46 of FIG. 2, this multiplier then having its rate-determining input connected to the output of counter 46 via a decoding circuit.

We claim:

1. Transmitter apparatus for an information transmission system, which system comprises at least two such apparatuses having their outputs coupled to a common transmission path, said apparatus comprising a transmitter, an indicator circuit for generating an output signal indicative of whether or not the transmission path is in use, and a control circuit having an input for a transmit-request signal, the output of said indicator circuit being coupled to said control circuit and said control circuit having an output thereof, which output is coupled to a control input of said transmitter, for providing a transmission activation signal for said transmitter in response to the application of a transmit-request signal to the control circuit input, the instant of generator of said activation signal being dependent on the output of said indicator circuit whereby, if said indicator circuit is indicating that the transmission path is in use when the transmit-request signal is applied to the control circuit input, said activation signal will be generated at an instant which occurs a predetermined time interval after the indicator circuit subsequently indicates that the transmission path has become clear, and only then provided that the indicator circuit is then indicating that the transmission path is clear, characterised in that the control circuit comprises means for varying said predetermined time interval inversely with respect to the time which elapses between the application of said transmit-request signal to said input and the subsequent indication by the indicator circuit that the transmission path has become clear.

2. Apparatus as claimed in claim 1, characterized in that the control circuit further comprises means for generating at its output a transmission activation signal for the transmitter substantially immediately in response to the application of a transmit-request signal to its input if the indicator circuit is indicating that the transmission path is clear when the transmit-request signal is applied to the control circuit input.

3. Apparatus as claimed in claim 1 or claim 2, for an information transmission system which includes a transmitter/receiver to the receiver section of which said transmission path extends, which transmitter/receiver comprises means for responding to the reception of transmissions from a plurality of transmitter apparatuses of the system simultaneously on the same channel by transmitting a first type of signal, and further comprises means for responding to the subsequent reception of a further transmission from a transmitter apparatus of the plurality by transmitting a second type of signal, characterized in that said indicator circuit comprises means for producing a first and a second kind of output signal in response to reception by the apparatus of the first and second types of signal, respectively, and in that said control circuit comprises means for responding to the production of an output signal of the first kind by the indicator circuit subsequent to the generation of a first activation signal by the control circuit, by generating a second activation signal at an instant which occurs a predetermined time interval after the indicator circuit produces its output signal of the first kind, and only then provided that the indicator circuit is not then producing an output signal of the second kind, this predetermined time interval being inversely proportional to the time which elapsed between the application of a transmit-request signal to the control circuit input and the subsequent generation of the first activation signal at the control circuit output, and moreover, depending on said time in such manner that smaller differences in said time will result in different values thereof than are the difference required to result in different values of the predetermined time interval after which the first activation signal was generated.

4. Apparatus as claimed in claim 3 characterized in that the control circuit comprises first and second counters, means for responding to the application of a transmit-request signal to the control circuit input at a time when said indicator circuit is indicating that the transmission path is in use, by causing the content of the first counter to be periodically incremented or decremented, starting from a predetermined value of said content, for as long as the indicator circuit continues to indicate that the transmission path is fully occupied, means for responding to the subsequent indication by said indicator circuit that the transmission path has become clear, by causing the content of the second counter to be periodically incremented or decremented either (a) starting from a fixed first value and continuing towards a second value which bears a predetermined relationship to the value which the content of the first counter had when the indicator circuit produced said subsequent indication or (b) towards a fixed second value starting from a first value which bears a predetermined relationship to the value which the content of the first counter had when the indicator circuit produced said subsequent indication, and means for responding to the count in the second counter reaching the relevant second value, by causing said activation signal to be generated, provided that the indicator circuit is then indicating that the transmission path is clear.

5. Apparatus as claimed in claim 4, characterized in that the control circuit comprises means for responding to the generation of an output signal of the first kind by said indicator circuit subsequent to the generation of a first activation signal by said control circuit, by causing the content of a counter to be periodically incremented or decremented either (a) starting from a fixed first value and continuing towards a second value which bears a predetermined relationship to the value which the content of another counter has when the indicator circuit produces its output signal of the first kind or (b) towards a fixed second value starting from a first value which bears a predetermined relationship to the value which the content of another counter has when the indicator circuit produces its output signal of the first kind, said another counter having been incremented or decremented, starting from a predetermined value, from the instant that the transmit-request signal which gave rise to said first activation signal was applied to the input of the control circuit, and means for responding to the count in the said another counter reaching the relevant said second value, by generating a second activation signal, provided that the indicator circuit is not then producing an output signal of the second kind.

6. Apparatus as claimed in claim 5, characterized in that the functions of the said means are performed by a programmed digital signal processing system.

* * * * *

UNITED STATES PATENT AND TRADEMARK OFFICE
CERTIFICATE OF CORRECTION

PATENT NO. : 4,319,222

DATED : March 9, 1982

INVENTOR(S) : CHRISTOPHER K. DAVIS ET AL

It is certified that error appears in the above—identified patent and that said Letters Patent is hereby corrected as shown below:

Claim 1, Column 23, line 1

"generator" should be --generation--

Signed and Sealed this

Eighth Day of June 1982

|SEAL|

Attest:

Attesting Officer

GERALD J. MOSSINGHOFF

Commissioner of Patents and Trademarks